(12) United States Patent
Daly

(10) Patent No.: US 6,210,009 B1
(45) Date of Patent: Apr. 3, 2001

(54) NON-INVERTING INSPECTION MIRROR

(76) Inventor: John Daly, 1322 Elysium Blvd., Mount Dora, FL (US) 32757

( * ) Notice: Subject to any disclaimer, the term of this patent is extended or adjusted under 35 U.S.C. 154(b) by 525 days.

(21) Appl. No.: 08/616,161

(22) Filed: Mar. 14, 1996

Related U.S. Application Data

(60) Provisional application No. 60/793,000, filed on Jul. 5, 1994.

(51) Int. Cl.⁷ .................................................. G02B 7/182
(52) U.S. Cl. ............................................. 359/882; 359/834
(58) Field of Search ..................... 359/553, 834, 359/835, 836, 857, 882, 831, 832, 833, 850, 855, 856; 433/29, 30; 362/138, 139

(56) References Cited

U.S. PATENT DOCUMENTS

| | | | |
|---|---|---|---|
| H396 | * | 1/1988 | Spry ........................................ 359/831 |
| 1,540,409 | * | 6/1925 | McCray .................................. 359/855 |
| 3,489,486 | * | 1/1970 | de la Cierva .......................... 359/834 |
| 3,879,105 | * | 4/1975 | Broche et al. ......................... 359/831 |
| 5,233,475 | * | 8/1993 | Ohshita .................................. 359/836 |

FOREIGN PATENT DOCUMENTS 000 171 028 * 11/1921 (GB) ..................................... 359/834

* cited by examiner

*Primary Examiner*—Cassandra Spyrou
*Assistant Examiner*—M. Robinson
(74) *Attorney, Agent, or Firm*—Charles M. Kaplan

(57) ABSTRACT

A handheld inspection mirror uses right angled mirror surfaces and triangular prism means to provide a non-inverted undistorted image from objects located in remote or relatively inaccessible places.

15 Claims, 5 Drawing Sheets

NON-INVERTING INSPECTION MIRROR

This application claims benefit to U.S. provisional No. 60/793,000 filed Jul. 5, 1994.

BACKGROUND OF THE INVENTION

This invention relates to inspection mirrors, and more particularly to handheld mirrors used to inspect inaccessible locations. Handheld inspection mirrors commonly utilize a flat glass mirror ( 1 to 2 inches in diameter) attached to a telescoping tube. This allows convenient storage in a shirt pocket, and permits access to remote places for observation after extension of the tube. These tools are used by many technicians, such as HVAC servicemen. However, prior art inspection mirrors produced an inverted image, which often results in misread model or serial numbers. Use of two mirrors at right angles has been proposed but this causes multiple images which are too confusing to be practical.

In geometrical optics terminology, a plane prior art mirror presents an inverted virtual image. The right angle prisms disclosed in this application are used as inspection mirrors for image correctness. The right angle prism employed as a porro prism in this invention presents an erect or non-inverted virtual image. The reflected image from two surfaces within the prism corrects the inverted image normally produced by a plane prior art mirror.

OBJECTIVES OF THE INVENTION

Accordingly, it is an object of this invention to provide improved inspection mirrors.

Another object is to provide handheld inspection mirrors that do not cause a distorted or inverted image.

An additional object is to employ a right angle prism as a porro prism that reflects a non-inverted virtual image with little or no loss or distortion of image quality.

A further object is to protect the reflective surfaces of an inspection mirror from damage.

Another object is to provide small, light-weight, durable, relatively inexpensive, handheld inspection mirrors that are easily usable by inexperienced or handicapped people, that produce clear exact non-inverted images, that are easy to manufacture, and that do not possess defects found in similar prior art inspection mirrors.

Other objects and advantages of the invention will be found in the specification and claims, and the scope of the invention will be set forth in the claims.

DESCRIPTION OF THE INVENTION

Figure 1:
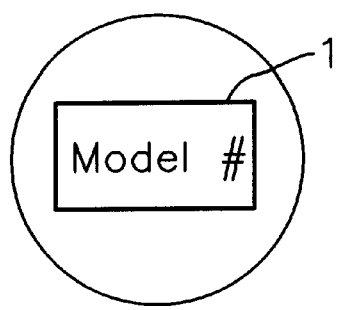
FIG. 1 shows the reflected image produced by an inspection mirror in accord with this invention.
Figure 2:
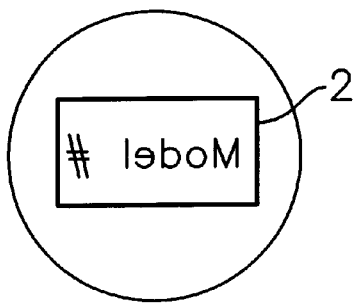
FIG. 2 shows the reflective image produced by a conventional prior art inspection mirror.
Figure 3:
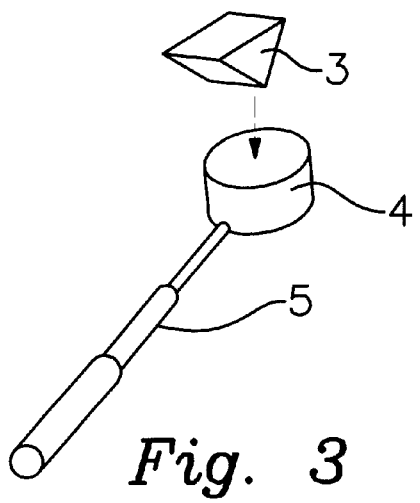
FIG. 3 is an exploded isometric view of an embodiment of this invention.
Figure 4:
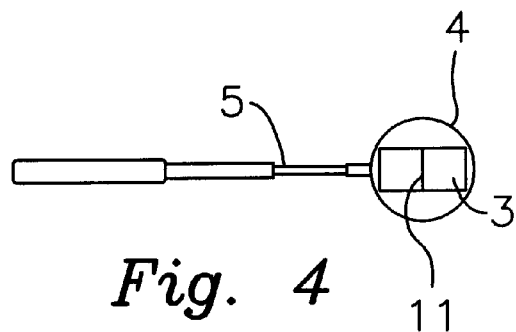
FIG. 4 is top plan view of the embodiment of FIG. 3.
Figure 5:
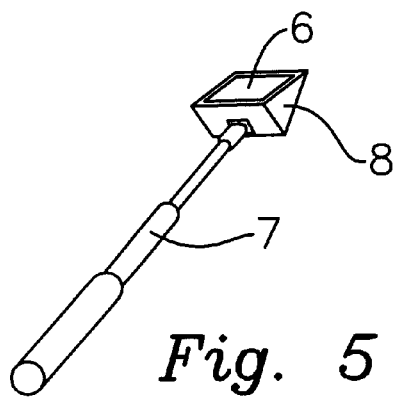
FIG. 5 is an isometric view of another embodiment of the invention.
Figure 6:
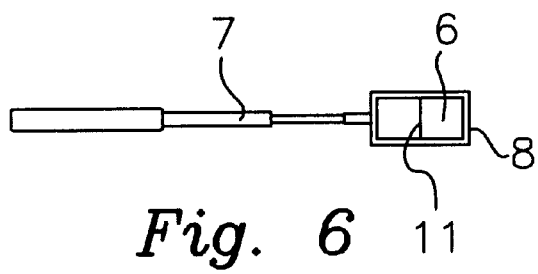
FIG. 6 is a top plan view of the embodiment of FIG. 5.

FIG. 1. shows the image 1 presented from reflection by the right angle prism in accord with this invention, as compared to the inverted image 2 from a prior art plane mirror reflection as shown in FIG. 2. The problem presented by serial number recognition is easily realized by comparing FIGS. 1 and 2. An inspection mirror employing this invention would include a transparent right angle prism 3 held in a cylindrically shaped fixture 4 which can be attached to a conventional telescoping handle 5 by bonding, spot welding, or with a threaded fit. The fixture 4 defines connecting means and may be square, rectangular, or any convenient polygon, as an alternative to the illustrated cylindrical shape. Prism 3 may be attached to the fixture 4 with adhesives, such as epoxies, or the fixture 4 could be molded around the prism. The embodiment of FIGS. 5 and 6 uses a pyramidal fixture 8 to attach a prism 6 to a handle 7. In all other respects the embodiment of FIGS. 5 and 6 is identical to that of FIGS. 3 and 4. Fixtures 4 and 8 may be eliminated, and handles 5 and 7 could then be attached directly to a surface of prisms 3 and 8 that is not used in the transmission or reflection of an image. Such direct connection of the handle and prism may be accomplished by using conventional connecting means, such as a hinge or a bracket, secured directly to the prism.

Figure 7:
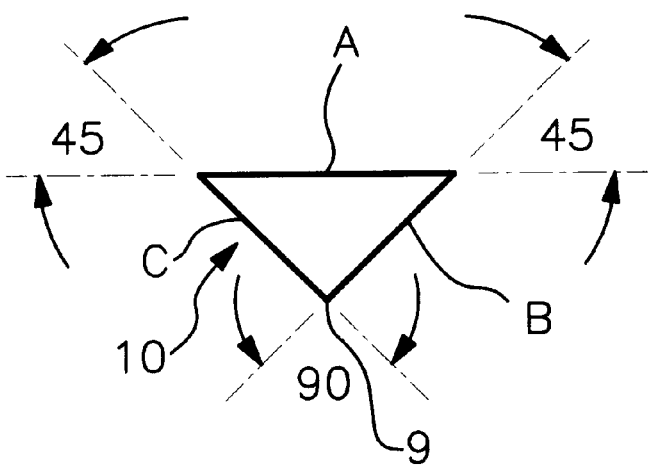
FIG. 7 is a top plan view of a right angle prism as used to practice this invention.
Figure 8:
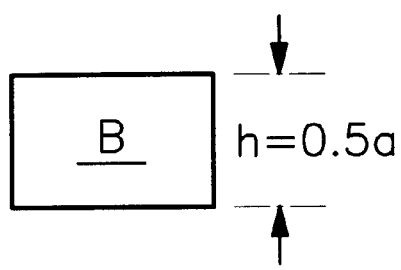
FIG. 8 is a side view of the prism in FIG. 7.
Figure 9:
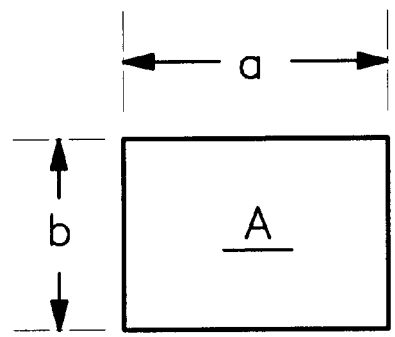
FIG. 9 is a front end view of the prism in FIG. 7.

FIGS. 7–9 illustrate the geometry of a right angle prism mirror design in accord with this invention. The prism 10 is defined with the 90 degree angle between reflecting surfaces B and C being critical. The surfaces B and C have equal lengths, and the angles AC and AB are 45 degrees. The height h of the prism 10 becomes a reference dimension, and should be equal to one half of the length of the side A or the hypotenuse of the prism. The width of the side A is designated b in FIG. 9. A prism 10 used in an inspection mirror in accord with this invention could have the following dimensions:

a=1.0 inches; b=0.7 inches; and h=0.5 inches.

This invention employs the surface of the hypotenuse A as the front entrance and exit surface for the non-inverting inspection mirror. The two orthogonal surfaces B and C are the reflective or mirror surfaces. The intersection 9 of surface B with surface C must be as narrow as possible. This may be called the roof line, and the width of this roof line manifests itself as a non-reflecting void-line in the center of the mirror. Therefore a wide roof line would appear as a equally wide black or dark line at 11 In the center of the mirror, as shown in FIGS. 4 and 6.

Figure 10:
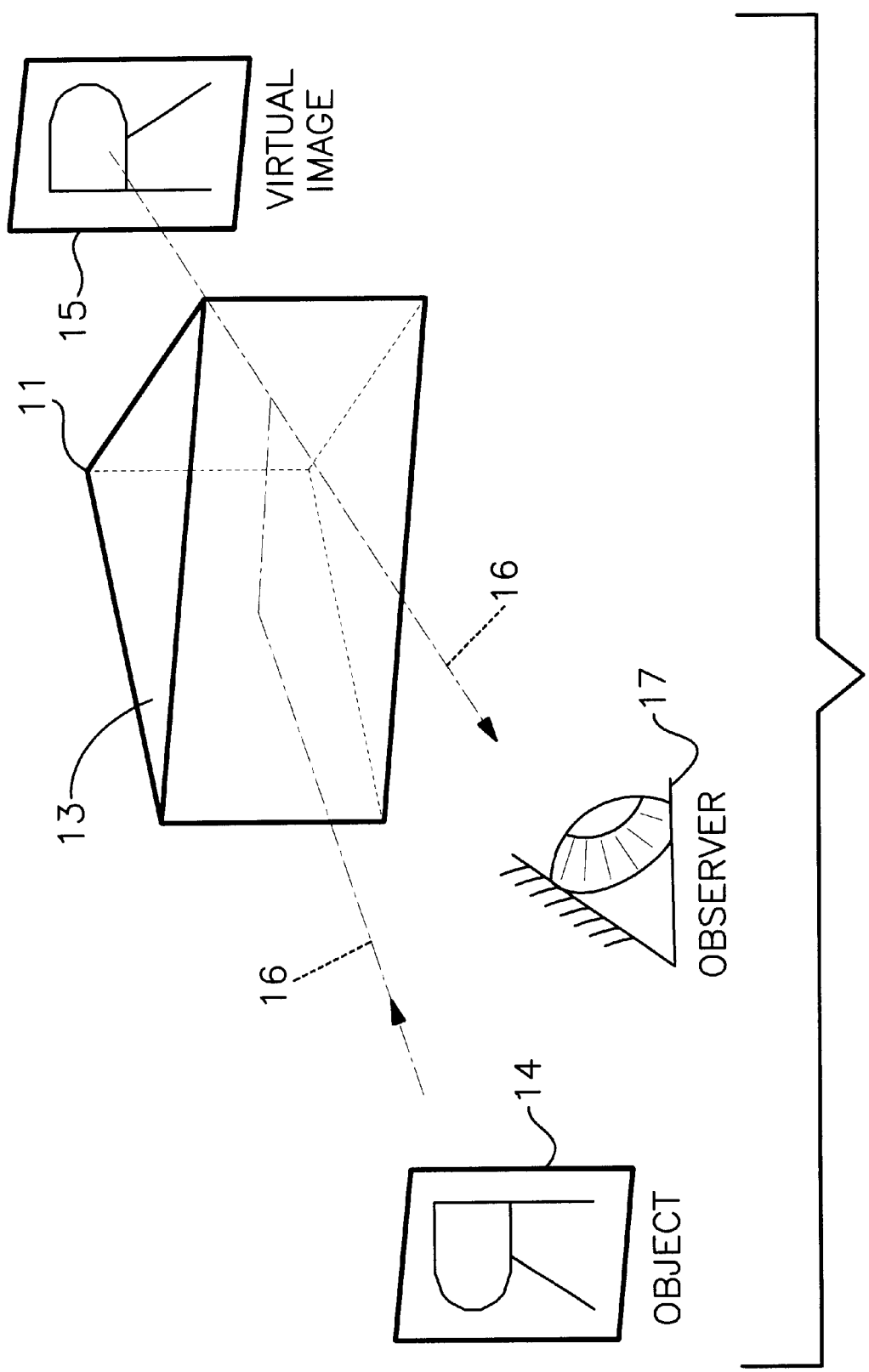
FIG. 10 illustrates the optical properties of a right angle prism as employed to practice this invention.

FIG. 10 shows the optical schematic of a right angle prism 13 as used in this invention. An object 14 that is to be observed is placed in front of the prism. The object 14 has an optical path through the prism as shown by vectors 16 which form a virtual image 15. This virtual image is seen by the observer 17 as erect or non-inverted, making the image easily readable.

A right angle prism in accord with this invention can be obtained simply by polishing or coating its intersecting outside optical surfaces, such as B and C as shown in FIG. 7, thereby relying upon Total Internal Reflection (TIR) from those intersecting surfaces. To enhance the reflection percentage under all conditions, coatings (maximum reflection) may be applied to the optical surfaces, such as sides B and C. A thin film of such coatings may be applied to the optical components through chemical vapor deposition, as an option to improve the performance of this invention. The light entrance surface A may be anti reflection coated with single or multiple layers of thin film coating with alternating high and low indices of refraction appropriate for minimizing the reflection percentage according to calculations of the Fresnel Equations. A basic example of an anti reflection coating which is commonly used for photographic optics is the application of a quarter-wavelengththickness of MgF2 as a single layer to the surface of borosilicate glass which reduces normal reflectance from 4% to 1.3%. The two orthogonal surfaces B and C can be Maximum Reflection (Max-R) coated. Here again, multiple layers of differing indices of refraction materials can be applied in thin layers or evaporated thin layers of metals, such as silver or aluminum, can be utilized by conventional techniques.

Figure 11:
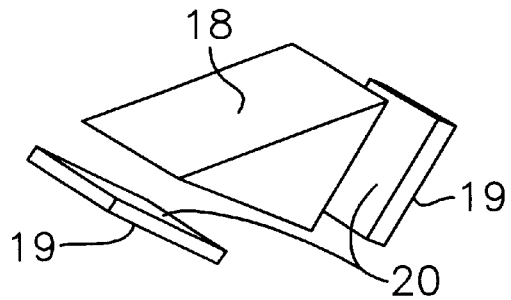
FIG. 11 is an exploded isometric view showing another embodiment this invention.
Figure 12:
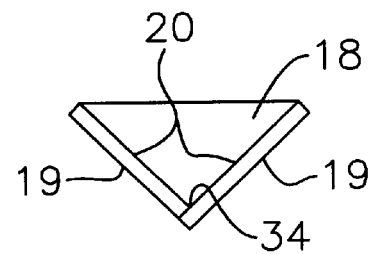
FIG. 12 is a top plan view of the prism shown in FIG. 11 showing the mirrors attached to a prism.

FIGS. 11 and 12 illustrate another technique for improving reflection by optically attaching flat mirror surfaces to each of the flat reflective outside intersecting surfaces of the prism. The prism 18 may be made, for example, from glass, machined and polished plastic (such as acrylic), or cast or injection molded plastic. Two first or front surface mirrors 19 can be bonded with optical cement such as AbleBond to the prism 18. These mirrors may be glass, metal or plastic such as acrylic. Most mirrors are plate glass that is silver coated on the second or back mirror surface. The clear glass serves to protect the second mirror surface. A first surface mirror is more prone to damage because its silvered or reflective surface is exposed, but this eliminates the added refraction encountered in second surface coated mirrors. Elimination of the refraction of second surface mirrors is necessary to the practice of this invention. By using only mirrors having first or front mirror surfaces 20, the intersection or prism roof line of these mirrors becomes nearly invisible; this results in a nearly flawless mirror image 15. The assembly comprising mirrors 19 and prism 18 may be connected to a telescoping handle by connecting means as described above with reference to the embodiments of FIGS. 1–6.

Figure 13:
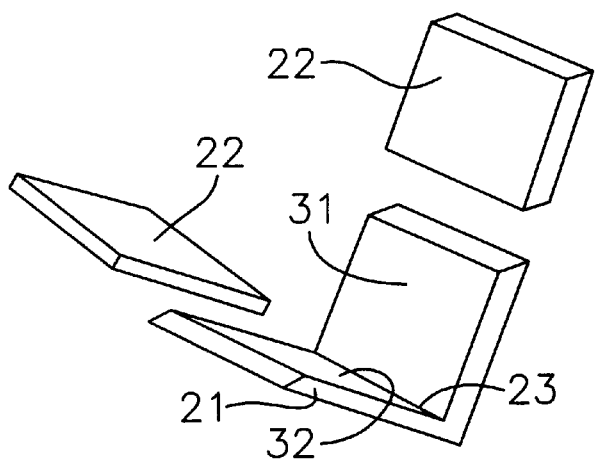
FIG. 13 is an exploded isometric view showing another embodiment of the invention.
Figure 14:
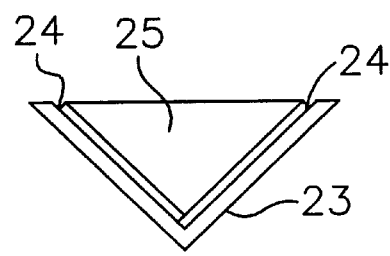
FIG. 14 is a top plan view of the embodiment shown in FIG. 13.

FIGS. 13 and 14 illustrate additional embodiments of this invention which start with a rigid right angle support or reference substrate 21 in which two mirror surfaces 24 are applied or supported on the interior intersecting surfaces 31 and 32 of the substrate. The surfaces 24 may be two first surface mirrors 22 bonded to substrate 21 with a controlled thickness optical cement, such as AbleBond, or an epoxy, such as 3-M 2216. This will create a prism-effect with the two mirrors at 90 degrees to each other and with a tight intersection to form a minimum width roof line at 23. The substrate 21 may be metal or other materials such as plastic, which can be either mirror polished or coated as reflective surfaces. If the substrate 21 is coated or polished to a satisfactory mirror-like finish, the mirrors 22 will not be needed. A clear plastic material, such as acrylic, fills the interior of substrate 21 to complete the mass of the prism 25. The mirror surfaces 24 can be the first surface mirrors 22, or reflective coatings applied to the intersecting surfaces 31 and 32 of the substrate 21, or the surfaces 31 and 32 may be polished to a mirror quality. The prism mass 25 may be cast or injection molded. The right angled mirror surface assembly, including substrate 21, may be connected to a telescoping handle by connecting means as described above with reference to the embodiments of FIGS. 1-6.

Figure 15:
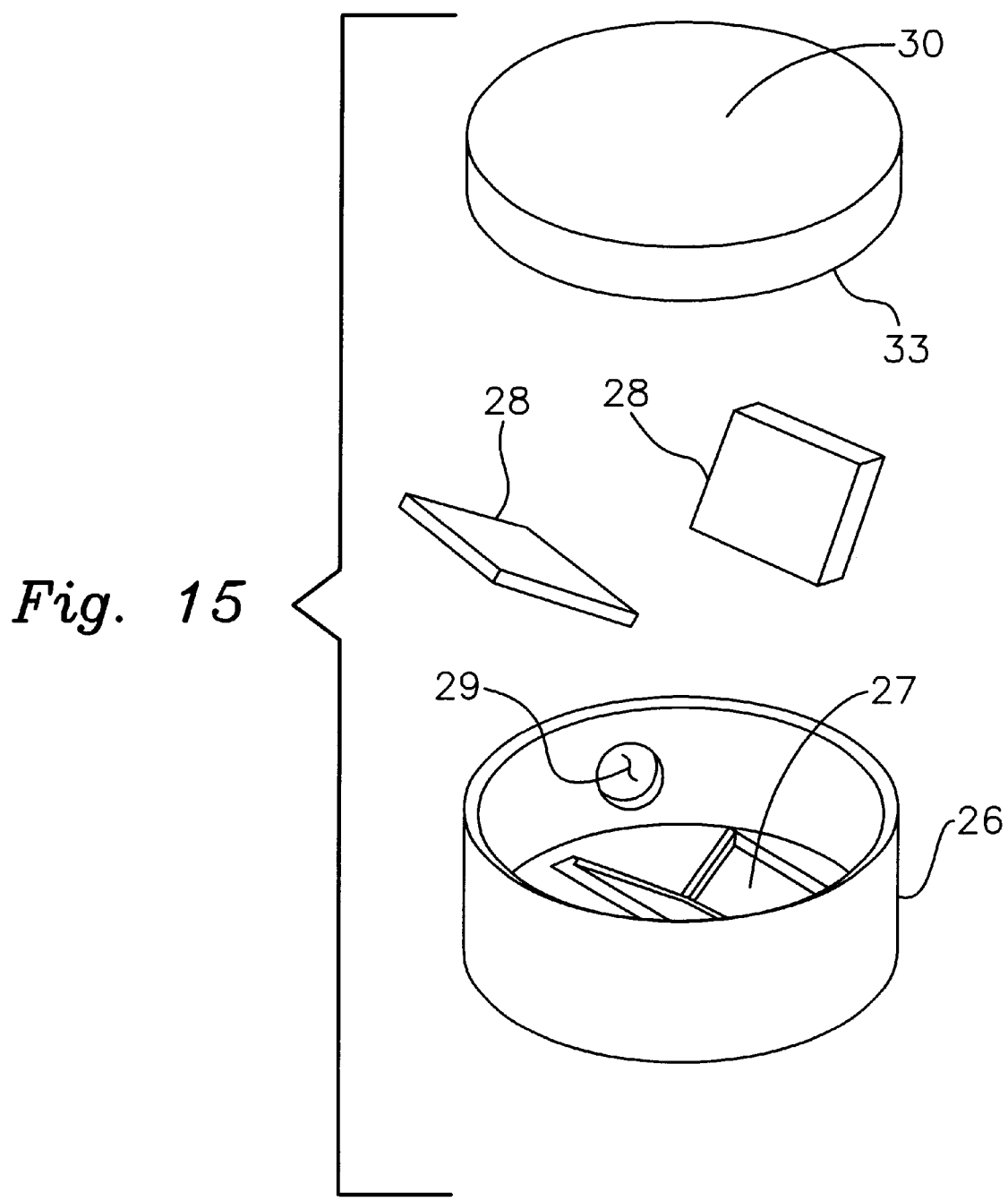
FIG. 15 is an exploded isometric view showing another embodiment of the invention.

FIG. 15 illustrates an insert-injection mold process for making an inspection mirror in accord with this invention. A tooling fixture 26 may have an interior volume which is shaped like a cylinder or prism.

The tooling must accommodate a holding boss 27 to accept and hold two first surface mirrors 28 in the required perpendicular configuration. Details of the injection mold tool are not included since they are conventional. It is critical that the mirrors 28 be held at a right angle with minimum roof line at their intersection. A filling port 29 enables injecting of plastic into the mold. A top 30 of the tooling fixture must have an optically polished surface 33 on its inside in order for the mold to produce an optical clear and flat front surface on the final prism assembly.

It has thus been shown that by the practice of this invention a mirror for inspecting relatively inaccessible or tight locations can provide an image in which objects are not inverted and numbers are not reversed. These accurate images may be achieved by the use of a pair of first surface mirrors 19 that intersect at a right angle so as to produce a minimum line of intersection at 34. This minimizes or eliminates the dark or void area that can occur in the reflected image at the line of intersection of mirrored surfaces. The same minimization of interference with the reflected image at the line of intersection is achieved in the other embodiments of this invention because the mirrored surfaces directly intersect with each other, as for example when the surfaces 31 and 32, or the surfaces of the sides B and C, are given reflective finishes of mirror quality. In all embodiments of the invention, the mirrored reflecting surfaces are protected from distortion and damage from scratching by transparent triangular prism means, such as prism 18, or the prismatic mass 25, or the body of the prism ABC.

While the present invention has been described with reference to particular embodiments, it is not intended to illustrate or describe all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What I claim as new and desire to secure by Letters Patent of the United States is:

1. An inspection mirror that produces a single non-inverted image, comprising: a solid triangular prism made from a solid mass of transparent material, said solid prism having a rectangular hypotenuse and a pair of rectangular sides of equal length that intersect said hypotenuse at angles of forty five degrees, said rectangular sides defining a right angle at their line of intersection, said hypotenuse being transparent to the passage of light, a rectangular mirrored surface completely covering each of said rectangular sides, said rectangular mirrored surfaces facing said hypotenuse for reflecting light that has entered said solid prism through said hypotenuse, said rectangular mirrored surfaces producing said single non-inverted image by means of light reflected from both of said rectangular sides that leaves said solid prism through said hypotenuse, said solid mass of transparent material completely filling the space between said rectangular mirrored surfaces and said hypotenuse so as to protect said rectangular mirrored surfaces, said line of intersection of said rectangular sides being the only void in said single non-inverted image caused by the structure of said inspection mirror, and handle means for positioning said inspection mirror in a location being observed, and means for connecting said handle means to said solid prism.

2. The inspection mirror defined in claim 1, further comprising fixture means containing said solid triangular prism, said handle means being connected to said fixture means.

3. The inspection mirror defined in claim 1, wherein said unobstructed rectangular mirrored surfaces comprise two first surface mirrors bonded to said rectangular sides of said prism.

4. The inspection mirror defined in claim 3, wherein said first surface mirrors contact each other only at said line of intersection.

5. The inspection mirror defined in claim 1, wherein said rectangular mirrored surfaces comprise polished intersecting outside surfaces of said solid prism.

6. The inspection mirror defined in claim 1, wherein said rectangular mirrored surfaces comprise mirror-coated intersecting outside surfaces of said solid prism.

7. The inspection mirror defined in claim 1, wherein said unobstructed rectangular mirror surfaces are located outside of said solid prism.

8. An inspection mirror that produces a single non-inverted image, comprising: a solid triangular prism made from a solid mass of transparent material, said solid triangular prism having a rectangular hypotenuse and a pair of rectangular sides of equal length that intersect said rectangular hypotenuse at angles of forty five degrees, said rectangular sides defining a right angle at their line of intersection, said rectangular hypotenuse being transparent to the passage of light, a rectangular mirrored surface completely covering each of said rectangular sides, said rectangular mirrored surfaces being located outside of said solid triangular prism and facing said rectangular hypotenuse for reflecting light that has entered said solid triangular prism through said rectangular hypotenuse, said rectangular mirrored surfaces producing said single non-inverted image by means of light reflected from both of said rectangular mirrored sides that leaves said solid triangular prism through said rectangular hypotenuse, said solid mass of transparent material completely filling the space between said rectangular mirrored surfaces and said rectangular hypotenuse so as to protect said rectangular mirrored surfaces, said line of intersection of said rectangular mirrored sides being the only void in said single non-inverted image caused by the structure of said inspection mirror, and handle means for positioning said inspection mirror in a location being observed, and means for connecting said handle means to said solid triangular prism.

9. The inspection mirror defined in claim 8, further comprising fixture means containing said solid triangular prism, said handle means being connected to said fixture means.

10. The inspection mirror defined in claim 8, wherein said rectangular mirrored surfaces comprise two rectangular first surface mirrors bonded to said rectangular sides of said solid triangular prism.

11. The inspection mirror defined in claim 10, wherein said rectangular first surface mirrors contact each other only at said line of intersection.

12. The inspection mirror defined in claim 8, wherein said rectangular mirrored surfaces comprise polished intersecting outside surfaces of said solid triangular prism.

13. The inspection mirror defined in claim 8, wherein said rectangular mirrored surfaces comprise mirror-coated intersecting outside surfaces of said solid triangular prism.

14. An inspection mirror that produces a single non-inverted image, comprising: a solid triangular prism made from a mass of transparent solid material, said prism having a rectangular hypotenuse and a pair of rectangular sides of equal length that intersect said hypotenuse at angles of forty five degrees, said sides defining a right angle at their line of intersection, said hypotenuse being transparent to the passage of light, a mirrored surface coated on each of said sides, said mirror coated surfaces being located outside of said solid prism and facing said hypotenuse for reflecting light that has entered said solid prism through said hypotenuse, said mirror coated surfaces producing said single non-inverted image by means of light reflected from both of said mirror coated sides that leaves said solid prism through said hypotenuse, said solid mass of transparent material completely filling the space between said mirror coated surfaces and said hypotenuse so as to protect said mirror coated surfaces, said line of intersection of said sides being the only void in said single non-inverted image caused by the structure of said inspection mirror, and handle means for positioning said inspection mirror in a location being observed, and means for connecting said handle means to said solid prism.

15. The inspection mirror defined in claim 14, further comprising fixture means containing said solid prism, said handle means being connected to said fixture means.

* * * * *